(12) United States Patent
Yegin et al.

(10) Patent No.: US 7,675,471 B2
(45) Date of Patent: Mar. 9, 2010

(54) VEHICULAR GLASS-MOUNT ANTENNA AND SYSTEM

(75) Inventors: Korkut Yegin, Grand Blanc, MI (US); Daniel G. Morris, Ovid, MI (US); Randall J. Snoeyink, Clarkston, MI (US); William R. Livengood, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 339 days.

(21) Appl. No.: 11/058,647

(22) Filed: Feb. 15, 2005

(65) Prior Publication Data

US 2005/0195115 A1    Sep. 8, 2005

Related U.S. Application Data

(60) Provisional application No. 60/550,280, filed on Mar. 5, 2004.

(51) Int. Cl.
  *H01Q 1/32* (2006.01)
(52) U.S. Cl. .................. 343/711; 343/713; 343/717
(58) Field of Classification Search .................. 343/713, 343/711; 315/700 MS, 704, 711–714, 717, 315/846
  See application file for complete search history.

(56) References Cited

U.S. PATENT DOCUMENTS

| | | | | |
|---|---|---|---|---|
| 4,882,592 A | * | 11/1989 | Studer et al. ................. | 343/715 |
| 5,712,645 A | | 1/1998 | Jellum et al. | |
| 5,742,255 A | * | 4/1998 | Afendras .................... | 343/713 |
| 6,008,767 A | * | 12/1999 | Taniguchi et al. ........... | 343/713 |
| 6,288,678 B1 | * | 9/2001 | Giannetti ............. | 343/700 MS |
| 6,313,796 B1 | * | 11/2001 | Potin et al. ............ | 343/700 MS |
| 6,448,935 B2 | * | 9/2002 | Fuchs et al. .................. | 343/713 |
| 6,518,935 B2 | * | 2/2003 | Louzir et al. ................. | 343/853 |
| 6,618,012 B1 | | 9/2003 | Louzir et al. | |
| 6,697,019 B1 | | 2/2004 | Hyuk-Joon et al. | |
| 2002/0008667 A1 | * | 1/2002 | Nguyen et al. .............. | 343/715 |
| 2002/0060646 A1 | * | 5/2002 | Petros et al. ................. | 343/713 |
| 2004/0135731 A1 | * | 7/2004 | Komatsu et al. ............ | 343/713 |
| 2004/0155825 A1 | * | 8/2004 | Komatsu et al. ............ | 343/713 |
| 2004/0263403 A1 | * | 12/2004 | Zafar et al. .................. | 343/713 |
| 2006/0152421 A1 | * | 7/2006 | Baranski ..................... | 343/713 |

FOREIGN PATENT DOCUMENTS

EP          0590928        4/1994

OTHER PUBLICATIONS

European Search Report dated Nov. 17, 2008.
EP search report dated Dec. 28, 2007.

* cited by examiner

*Primary Examiner*—David Hung Vu
*Assistant Examiner*—Tung X Le
(74) *Attorney, Agent, or Firm*—Jimmy L. Funke

(57) ABSTRACT

An antenna system for a vehicle including a front windshield glass and a rear windshield is disclosed. The antenna system comprises an antenna unit including a radiating element electromagnetically coupled to an excitation element. The radiating element is coupled to the front windshield glass, and the excitation element is positioned on a passenger compartment interior surface of the front windshield glass. The antenna system also comprises a high-gain antenna unit including first radiating elements, a second radiating element, a 90-degree phase shift circuit, and a low noise amplifier that is coupled to the phase shift circuit. The first radiating elements receive signals through the rear windshield glass. The antenna unit and the high-gain antenna unit may function in a diversity antenna configuration.

19 Claims, 5 Drawing Sheets

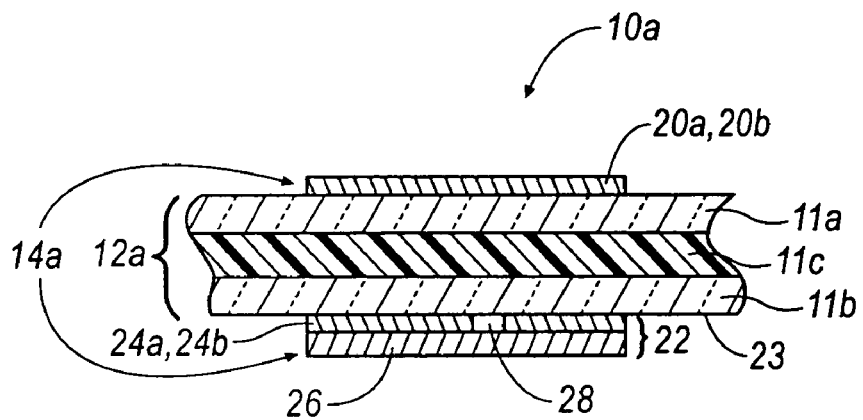
FIG. 4A
FIG. 4B                FIG. 4C
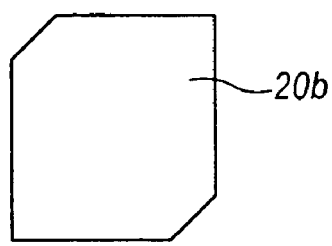 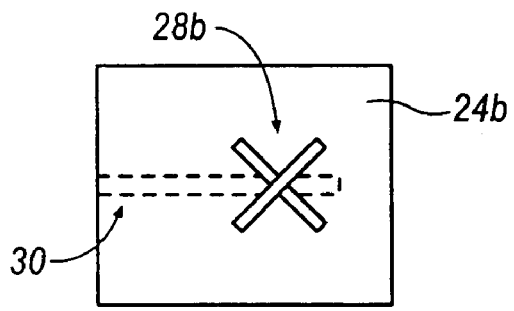
FIG. 4D                FIG. 4E

VEHICULAR GLASS-MOUNT ANTENNA AND SYSTEM

RELATED APPLICATIONS

This application claims priority to U.S. provisional patent application Ser. No. 60/550,280 filed Mar. 5, 2004.

TECHNICAL FIELD

The present invention generally relates to vehicular glass-mount antennas having improved radiation characteristics.

BACKGROUND OF THE INVENTION

It is known in the art that automotive vehicles are commonly equipped with audio radios that receive and process signals relating to amplitude modulation/frequency modulation (AM/FM) antennas, satellite digital audio radio systems (SDARS) antennas, global positioning system (GPS) antennas, digital audio broadcast (DAB) antennas, dual-band personal communication systems digital/analog mobile phone service (PCS/AMPS) antennas, Remote Keyless Entry (RKE) antennas, Tire Pressure Monitoring System antennas, and other wireless systems.

Currently, patch antennas are employed for reception and transmission of GPS [i.e. right-hand-circular-polarization (RHCP) waves] and SDARS [i.e. left-hand-circular-polarization (LHCP) waves]. Patch antennas may be considered to be a 'single element' antenna that incorporates performance characteristics of 'dual element' antennas that essentially receives terrestrial and satellite signals. SDARS, for example, offer digital radio service covering a large geographic area, such as North America. Satellite-based digital audio radio services generally employ either geo-stationary orbit satellites or highly elliptical orbit satellites that receive uplinked programming, which, in turn, is re-broadcasted directly to digital radios in vehicles on the ground that subscribe to the service. SDARS also use terrestrial repeater networks via ground-based towers using different modulation and transmission techniques in urban areas to supplement the availability of satellite broadcasting service by terrestrially broadcasting the same information. The reception of signals from ground-based broadcast stations is termed as terrestrial coverage. Hence, an SDARS antenna is required to have satellite and terrestrial coverage with reception quality determined by the service providers, and each vehicle subscribing to the digital service generally includes a digital radio having a receiver and one or more antennas for receiving the digital broadcast. GPS antennas, on the other hand, have a broad hemispherical coverage with a maximum antenna gain at the zenith (i.e. hemispherical coverage includes signals from 0° elevation at the earth's surface to signals from 90° elevation up at the sky). Emergency systems that utilize GPS, such as OnStar™, tend to have more stringent antenna specifications.

Unlike GPS antennas which track multiple satellites at a given time, SDARS patch antennas are operated at higher frequency bands and presently track only two satellites at a time. Thus, the mounting location for SDARS patch antennas makes antenna reception a sensitive issue with respect to the position of the antenna on a vehicle. As a result, SDARS patch antennas are typically mounted exterior to the vehicle, usually on the roof, or alternatively, inside the vehicle in a hidden location, for example, within an instrument panel. In some instances, such as cellular telephone mast antennas, antennas have been located on the exterior surface of automotive glass and the received signals are electromagnetically coupled through the glass to the vehicle's receiver. Electromagnetically coupling such antennas in an SDARS application, without an external amplifier, is very difficult due to inherent loss and distorted radiation patterns associated with front windshield glass composition, which includes an intermediate plastic layer sandwiched between inner and outer glass layers. Additionally, external antennas are highly visible, prone to being damaged, and not aesthetically pleasing.

BRIEF DESCRIPTION OF THE DRAWINGS

The inventors of the present invention have recognized these and other problems associated with glass-mount antennas. To this end, the inventors have developed an antenna system for a vehicle including a front windshield glass and a rear windshield. The present invention will now be described, by way of example, with reference to the accompanying drawings, in which:

FIG. 4A illustrates a cross-sectional view of the front windshield glass mount antenna according to one embodiment of the invention;

FIG. 4B illustrates a top view of an embodiment of a first element of the front windshield glass mount antenna according to FIG. 4A;

FIG. 4C illustrates a top view of an embodiment of a second element of the front windshield glass mount antenna according to FIG. 4A;

FIG. 4D illustrates a top view of another embodiment of a first element of the front windshield glass mount antenna according to FIG. 4A;

FIG. 4E illustrates a top view of another embodiment of a second element of the front windshield glass mount antenna according to FIG. 4A;

DESCRIPTION OF THE PREFERRED EMBODIMENTS

Figure 1:
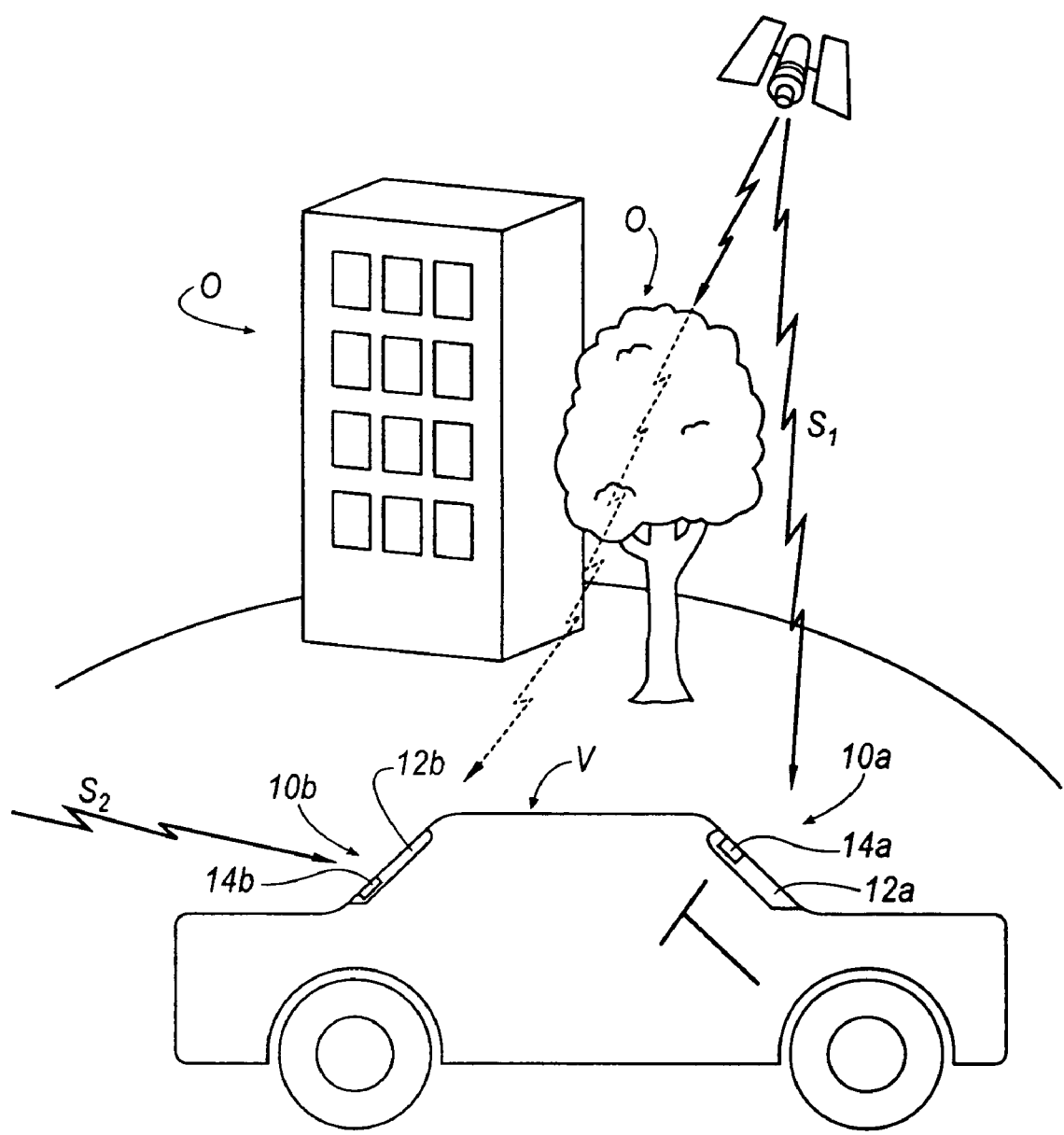
FIG. 1 illustrates a general side view of the vehicle glass mount antenna system.
Figure 2:
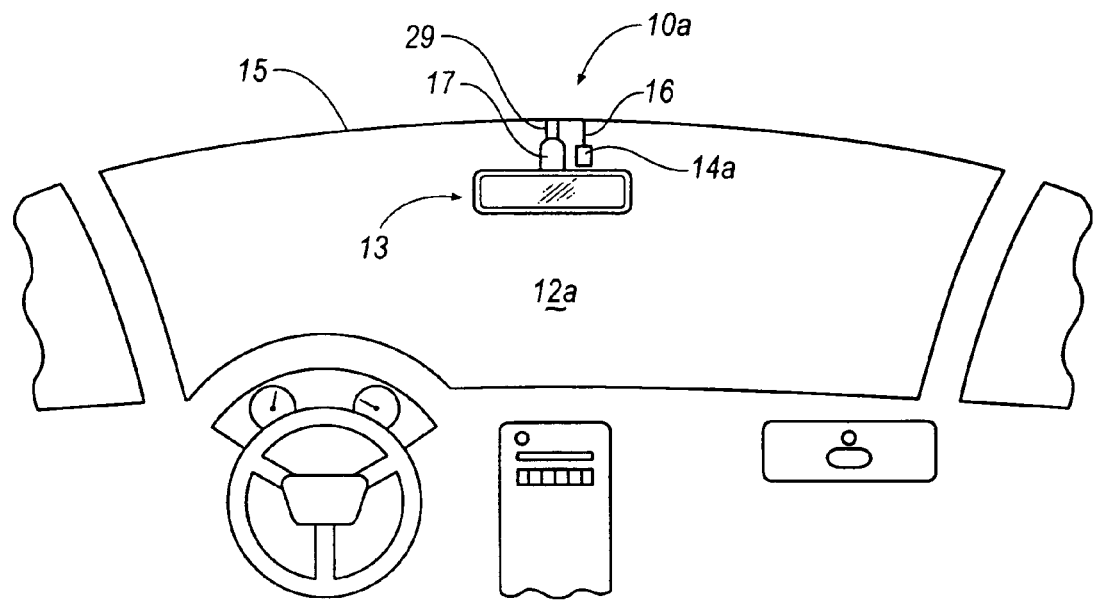
FIG. 2 illustrates a passenger compartment view of a front windshield glass mount antenna according to one embodiment of the invention.
Figure 3:
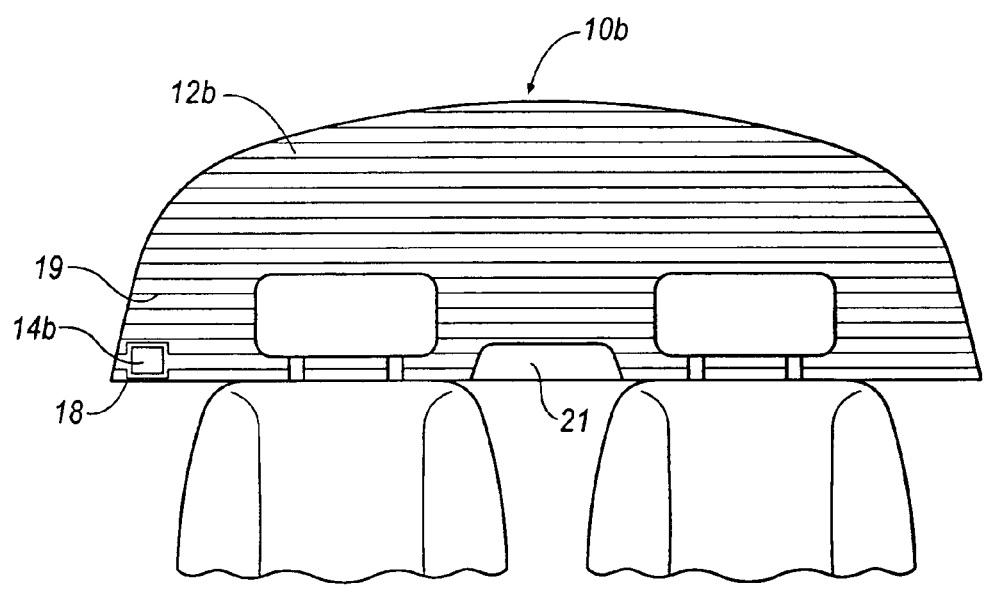
FIG. 3 illustrates a passenger compartment view of a rear glass mount antenna according to one embodiment of the invention.

The above described disadvantages are overcome and a number of advantages are realized by inventive antenna systems, which are generally illustrated at 10a, 10b in FIGS. 1-3. As illustrated in FIG. 1, a vehicle, V, includes a front windshield glass 12a and rear windshield glass 12b each including antenna units 14a, 14b, respectively. Referring to FIG. 2, the antenna unit 14a is shown proximate a rear-view mirror assembly 13 at a top portion 15 of the front windshield glass 12a that meets a headliner (not shown). The location of headliner provides the shortest path to route and hide wires 16 extending from the antenna unit 14a and rear-view mirror assembly 13. When implemented near the top portion 15, the antenna unit 14a should not come into direct contact with the vehicle body so as to ensure that the antenna unit 14a is not shorted out. As seen in FIG. 3, the antenna unit 14b is located near a corner 18 of the rear windshield glass 12b such that defroster wires 19 are routed about the mounting location of the antenna unit 14b. Although the antenna unit 14b is shown near the corner 18, the antenna unit 14b can be located at any desirable location on the rear windshield glass, but more preferably, in a location that is less visible to the passengers and driver. For example, in an alternative embodiment, the antenna unit 14b may be located between the rear windshield glass 12b and a rear brake light housing 21 so as to completely hide the antenna unit 14b from the passengers and driver.

Figure 5A:
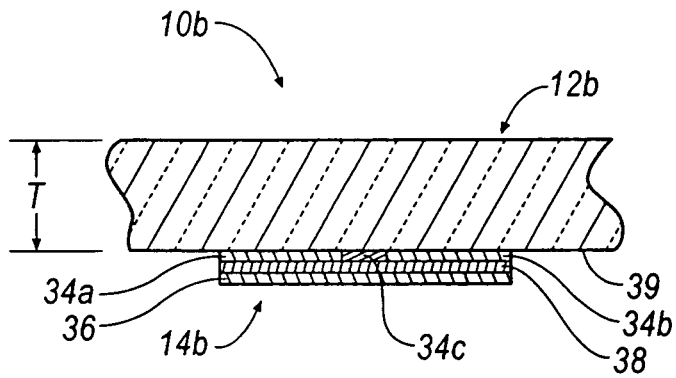
FIG. 5A illustrates a cross-sectional view of the rear windshield glass mount antenna according to one embodiment of the invention.

Referring now to FIGS. 4A and 5A, the front windshield glass 12a (FIG. 4A) includes a layer of plastic film 11c that is sandwiched between an outer glass layer 11a and an inner glass layer 11b, whereas, conversely, the rear windshield glass 12b (FIG. 5A) does not comprise an intermediate plastic film layer 11c, but rather a unit of glass defined by a thickness, T. Because the outer layer of glass 11a is exposed to the elements, which may undesirably result in failure and cracking, the inner layer of glass 11b is separated and shielded from the outer glass 11a by the intermediate plastic film layer 11c. Although sufficient in preventing complete physical failure of the front windshield glass 12a as described above, the plastic film layer 11c introduces losses and distorted radiation patterns related to antenna performance, which may significantly degrade the electromagnetic coupling characteristics of conventional on-glass antennas related to SDARS applications.

As seen in FIGS. 4A-4E, the antenna unit 14a, which is hereinafter referred to as an aperture coupled, slot-wave antenna 14a, provides a vehicular glass mount patch antenna while also improving electromagnetic coupling performance over conventional front windshield-mount antennas. The aperture coupled, slot-wave antenna 14a is essentially a two-element antenna system such that a radiation element 20a, 20b is electromagnetically coupled through the front windshield glass 12a to an excitation element 22 located on the interior surface of the front windshield glass 12a.

As illustrated in a first embodiment, the first element of the aperture coupled, slot-wave antenna 14a includes a substantially rectangular top metallization 20a (i.e. the radiation element). Although the term 'radiation/radiating element' is used in describing the antennas 14a, 14b, radiation and reception properties of an antenna are exactly the same. However, the antennas 14a, 14b described herein include radiation/radiating elements for reception purposes only. The substantially rectangular top metallization 20a is linearly polarized (i.e. to receive terrestrial signals) and may include any desirable conducting material, such as, for example, a silver conducting film. In an alternative embodiment, the top metallization 20a may include an optically transparent conducting film comprising, for example, indium tin oxide, to reduce the appearance of the aperture-couple slot-wave antenna 14a located about the front windshield glass 12a. The second element of the aperture coupled, slot-wave antenna 14a includes a bottom portion 22 (i.e. the excitation element) that is electromagnetically coupled through at least one layer 11a-11c of the three-layered windshield glass 12a.

The bottom portion 22 includes a substantially rectangular metal layer 24 and low noise amplifier (LNA) circuit 26. As illustrated, the metal layer 24 is further defined to include an absence of material in the form of a substantially off-centered rectangular slot 28a, according to an embodiment. The slot 28a in the metal layer 24 is excited by a microstrip line 30 (shown in phantom in FIG. 4C) that is carried by a dielectric material and located adjacent the LNA circuit 26. In operation, circular polarization is built into the antenna 14a as a result of the combination of the slot 28a and microstrip line 30, which excites electromagnetic waves received by the top metallization 20a. In an alternative embodiment illustrated in FIGS. 4D and 4E, the circular polarization may be achieved by providing a substantially off-centered cross-aperture 28b in the metal layer 24b in place of the substantially rectangular slot 28a. If a cross-aperture 28b is included, the top metallization 20b is a chamfered-edge patch element 20b. In yet another alternative embodiment, circular polarization may be built into the top metallization 20a by moving the slot 28a and microstrip line 30 into the top metallization 20a.

Figure 6A:
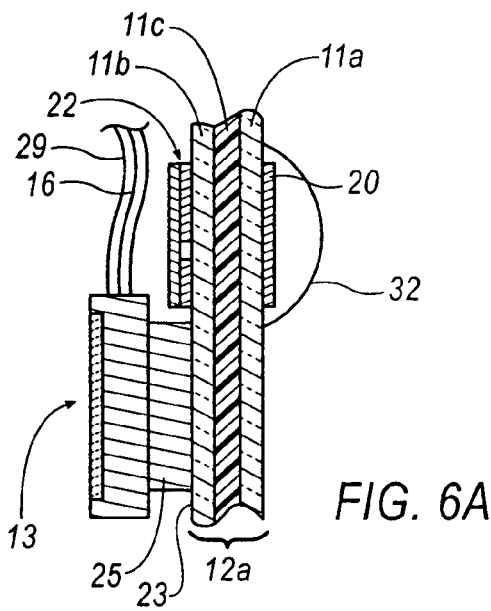
FIG. 6A illustrates a cross-sectional view of a rear-view mirror assembly and the front windshield glass mount antenna according to one embodiment of the invention.

Referring to FIG. 6A, a first implementation of the aperture-coupled slot-wave antenna 14a on the front windshield glass 12a is shown according to one embodiment of the invention. The aperture-coupled slot-wave antenna 14a is shown in a generally similar configuration as that in FIG. 4A except that a radome 32 is located over the top metallization 20a, 20b so as to protect the top metallization 20a, 20b from the elements. The radome 32 is a thin, plastic element that has a low dielectric constant, which, as a result, appears transparent to electromagnetic waves received by the top metallization 20a, 20b. To reduce the appearance of the aperture-coupled slot-wave antenna 14a, the bottom portion 22 of the slotted patch antenna array 14a is located on the passenger-compartment interior surface 23 of the glass layer 11b near an adjustment arm 25 of the rear-view mirror assembly 13. The bottom portion 22 may be affixed to the inner glass layer 11b by an adhesive and covered by a plastic closeout (not shown). As a result, the bottom portion 22 may be hidden by positioning the rear-view mirror assembly 13 proximate the bottom portion 22.

Figure 6B:
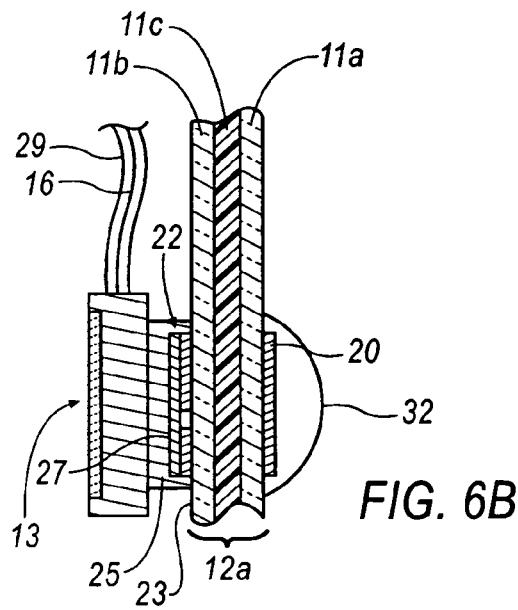
FIG. 6B illustrates a cross-sectional view of a rear-view mirror assembly and the front windshield glass mount antenna according to another embodiment of the invention.

In an alternative embodiment, as seen in FIG. 6B, the rear-view mirror assembly 13 may include a bezeled portion 27 located about the adjustment arm 25 that provides an adequate volume for housing the bottom portion 22. In this embodiment, the radome 32 covers the top metallization 20a, 20b. In this implementation, the bezel 27 performs the dual function of completely hiding the bottom portion 22, but may also provide a routing of wires 16 from the bottom portion 22 with other wires 16 associated with and extending from the rear-view mirror assembly 13 in a tube 29 to the headliner.

Figure 7A:
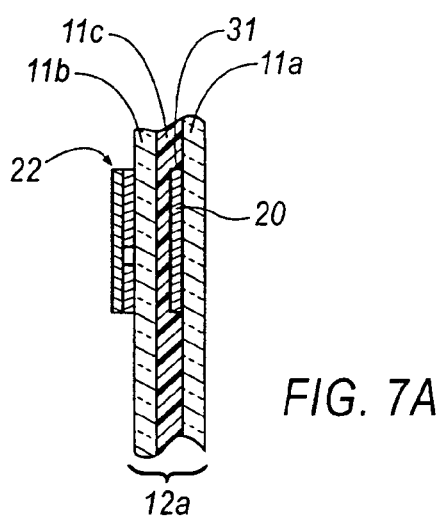
FIG. 7A illustrates a cross-sectional view of the front windshield glass mount antenna according to another embodiment of the invention.
Figure 7B:
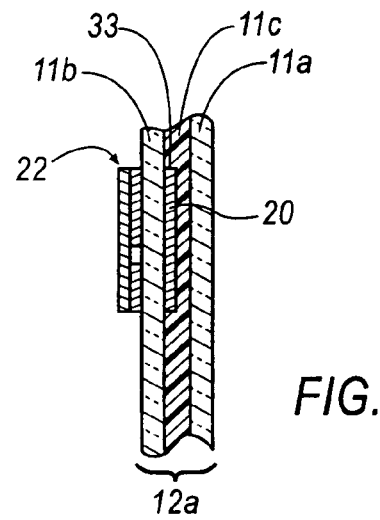
FIG. 7B illustrates a cross-sectional view of the front windshield glass mount antenna according to another embodiment of the invention.
Figure 8A:
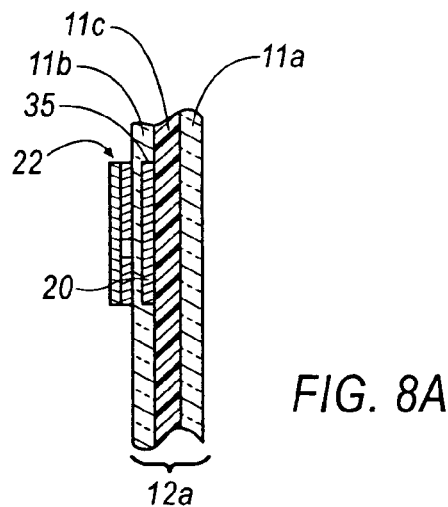
FIG. 8A illustrates a cross-sectional view of the front windshield glass mount antenna according to another embodiment of the invention.
Figure 8B:
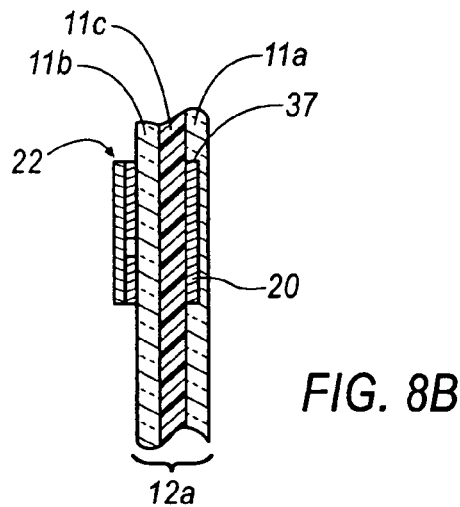
FIG. 8B illustrates a cross-sectional view of the front windshield glass mount antenna according to another embodiment of the invention.

As seen in FIGS. 7A and 7B, another embodiment of the antenna system 10a includes bezeled portions, illustrated generally at 31 and 33, in the intermediate plastic film layer 11c. As seen in FIG. 7A, the bezeled portion 31 is located adjacent to the outer glass layer 11a, and conversely as shown in FIG. 7B, the bezeled portion 33 is located adjacent the inner glass layer 11b. In yet another alternative embodiment, the glass layers 11a, 11b may each include bezeled portion, which are illustrated generally at 35 and 37. As seen in FIG. 8A, the bezeled portion 35 is located in the inner glass layer 11b adjacent the intermediate plastic film layer 11c, and conversely as shown in FIG. 8B, the bezeled portion 37 is located in the outer glass layer 11a adjacent the intermediate plastic film layer 11c.

The alternative embodiments illustrated in FIGS. 7A-8B function in eliminating the radome 32 because the top metallization 20a, 20b is protected from the elements by integrating the top metallization 20a, 20b within any one of the layers 11a-11c of the front windshield glass 12a. Additionally, the alternate embodiments illustrated in FIGS. 7A-8B locates the top metallization 20a, 20b closer to the bottom portion 22 to reduce the distance that the received signal has to travel via the electromagnetic coupling between the front windshield glass 12a. As a result, electromagnetic coupling through the intermediate plastic film layer 11c may be passed completely when the bezeled portion is located as illustrated in FIGS. 7B and 8A when the inner glass layer 11b or plastic layer 11c is bezeled out at 33 and 35 such that the top metallization 20a, 20b is positioned directly adjacent the inner glass layer 11b. Although bezeled portions 31, 33, 35, 37 are illustrated in FIGS. 7A-8B, the top metallization 20a,20b may include a reduced thickness such that the top metallization 20a, 20b is sandwiched between any one of the layers 11a-11c without including a bezeled portion 31, 33, 35, 37. However, if the top metallization 20a, 20b is sandwiched between the layers 11a-11c without the bezeled portion 31, 33, 35, 37, the material comprising top metallization 20a, 20b and/or the layers 11a-11c may have to be altered so as to compensate for material expansion considerations. Additionally, although the alternate embodiments illustrated in FIGS. 7A-8B do not show the combination of a bezel 31, 33, 35, 37 used in conjunction with the mounting of the bottom portion 22 within the adjustment arm 25 of the rear-view mirror assembly 13, any one of the illustrated bezels 31, 33, 35, 37 may be used in combination with the location of the bottom portion 22 within the adjustment arm 25 as shown in FIG. 6B.

Figure 5B:
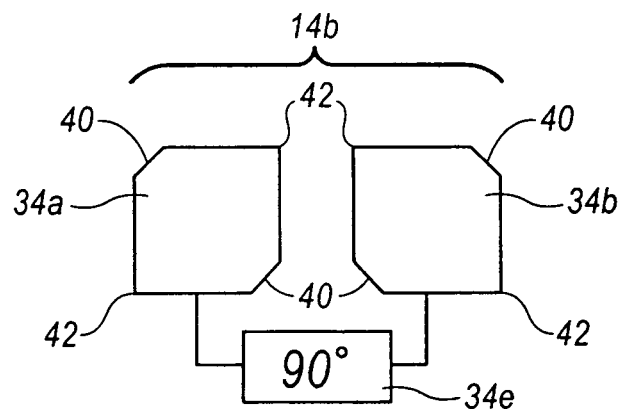
FIG. 5B illustrates an embodiment of a schematic top view of the rear windshield glass mount antenna according to FIG. 5A.
Figure 5C:
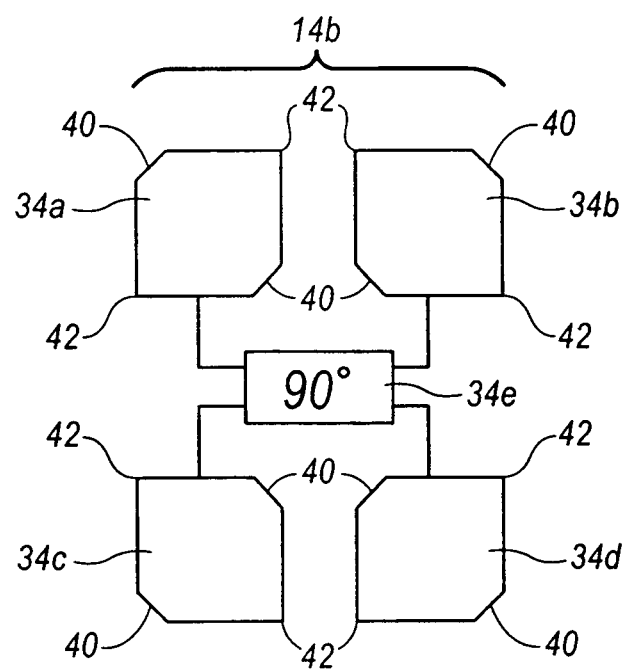
FIG. 5C illustrates another embodiment of a schematic top view of the rear windshield, glass mount antenna according to FIG. 5A.

Referring now to FIGS. 5A-5C, the antenna unit 14b, which is hereinafter referred to as an antenna array 14b, illustrates another embodiment of a vehicular glass mount patch antenna. The antenna array 14b includes a 90-degree phase shift circuit 34e coupled to two patch elements 34a, 34b (FIG. 5B), or, alternatively, four patch elements 34a-34d (FIG. 5C), adjacent the interior surface 39 of the rear windshield glass 12b. As illustrated, a dielectric layer 38 and a bottom metal layer 36 are disposed below the patch antenna elements 34a-34d and phase shift circuit 34e.

Both embodiments illustrated in FIGS. 5B and 5C are essentially high-gain antennas where each antenna element 34a-34d are spatially orientated by 90-degrees with respect to each other and fed through a phase network so as to provide better axial ratio and more radiation to compensate the inherent losses due to the dielectric constant of the rear windshield glass 12b. As illustrated, the antenna elements 34a-34d include symmetrically cut corners 40 to create left-hand circular polarization for the antenna array 14b, and, by including the phase shift circuit 34e, the phase difference between the antenna elements 34a-34d may be 0°, 90°, 180°, or 270°. Alternatively, if the opposing corners 42 were to be cut, the antenna array 14b would be a right-hand circular polarized antenna.

Because the aperture-coupled slot array antenna 14a and the antenna array 14b include optimum designs for implementation on the front and rear windshield glass 12a, 12b, respectively, a highly optimized vehicular diversity antenna configuration may be provided. Referring to Table 1 below, data comparing the average gain of a slot antenna (i.e., antennas shown in FIGS. 4A-4E) and a patch antenna (FIGS. 5A-5C) are shown for various elevation angles.

TABLE 1

| Elevation Angle | Regular Patch Antenna Gain (dBic) | Slot Coupled Antenna Gain (dBic) |
| --- | --- | --- |
| 0° | −3.59 | −4.21 |
| 5° | −3.25 | −3.75 |
| 10° | −2.54 | −2.98 |
| 20° | −0.99 | −2.14 |
| 25° | −0.23 | −0.66 |
| 30° | 0.03 | −0.79 |
| 40° | 0.43 | 0.70 |
| 50° | 1.27 | 1.37 |
| 60° | 1.91 | 2.50 |

According to the data presented above, the average antenna gain at every elevation angle of the slot coupled antenna is comparable to that of a regular solid patch antenna mounted interior to the vehicle. Although elevation angles from 0° to 60° has been displayed, slot coupled antenna performance is very good at elevation angles greater than 60° as well.

Referring back to FIG. 1, a diversity antenna applications operate on the principle such that two or more antenna units 14a, 14b complement each other to cover the expected satellite signal, $S_1$, to increase the probability of reception of the satellite signals, $S_1$, when physical obstructions, O, such as tall buildings or trees impede the line of sight (LOS) of at least one of the antenna units 14a, 14b. The embodiment of the diversity antenna systems also allows reception from terrestrial towers using either, or both antennas 14a, 14b to overcome signal blockage or fading. Because the aperture-coupled slot array antenna 14a and the antenna array 14b are inclined as a result of being positioned on the front and rear windshield glass 12a, 12b, terrestrial signal reception, $S_2$, of both antenna systems 10a, 10b is improved due to the tilt angle of the front and rear windshield glass 12a, 12b. Additionally, because the aperture-coupled slot array antenna 14a and the antenna array 14b are not located inside the vehicle, such as, for example, behind an instrument panel, signal radiation patterns do not have to contend with lossy vehicular materials.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A vehicle windshield glass high-gain patch antenna system, comprising:

a front windshield glass comprising at least three layers and a rear windshield glass comprising at least one layer;

an antenna unit including a first radiating element electromagnetically coupled to an excitation element through at least one of said front windshield layers, wherein the first radiating element comprises a linearly polarized, substantially rectangular metallization coupled to the front windshield glass, wherein the excitation element comprises a substantially rectangular metal layer positioned on a passenger compartment interior surface of the front windshield glass, wherein the front windshield glass includes a layer of plastic film that is intermediately located between an outer glass layer and an inner glass layer, wherein the excitation element includes a low noise amplifier (LNA) circuit, and wherein said radiating element metal layer defines a substantially off-centered rectangular slot excited by a microstrip line located adjacent the low noise amplifier (LNA) circuit; and a high-gain antenna unit including a 90-degree phase shift circuit coupled to at least two second radiating patch elements disposed adjacent a passenger compartment interior surface of the rear windshield glass, a second, bottom metal layer radiating element, a dielectric layer interconnection the first radiating patch elements and the second radiating element, wherein the phase difference between the second radiating elements is 0°, 90°, 180°, or 270°, wherein the second radiating elements receive signals through the rear windshield glass, and wherein the antenna unit and the high-gain antenna unit function in a diversity antenna configuration.

2. The antenna system according to claim 1, wherein the antenna unit is positioned proximate a rear-view mirror assembly at a top portion of the front windshield glass.

3. The antenna system according to claim 2, wherein the first radiating element includes a top metallization, and wherein the excitation element includes a substantially rectangular metal layer and a low noise amplifier circuit.

4. The antenna system according to claim 3, wherein the metal layer further comprises a slot, wherein a microstripeline circularly polarizes the antenna unit and is carried by a dielectric material and located adjacent the low noise amplifier circuit.

5. An aperture coupled, slot-wave vehicle antenna system, comprising:

windshield glass comprising at least three layers; and an antenna unit including a radiating element electromagnetically coupled to an excitation element through at least one of said windshield layers, wherein the radiating element comprises a linearly polarized substantially rectangular metallization coupled to the windshield glass, wherein the excitation element comprises a substantially rectangular metal layer positioned on a passenger compartment interior surface of the windshield glass, wherein the windshield glass includes a layer of plastic film that is intermediately located between an outer glass layer and an inner glass layer, wherein the excitation element includes a low noise amplifier (LNA) circuit, and wherein said radiating element metal layer defines a substantially off-centered rectangular slot excited by a microstrip line located adjacent the low noise amplifier (LNA) circuit.

6. The antenna system according to claim 5, wherein the microstripline excites the slot to create a circularly polarized antenna, and wherein the microstripline is carried by a dielectric material and located adjacent the LNA circuit.

7. The antenna system according to claim 6, wherein the slot comprises a substantially off-centered rectangular aperture.

8. The antenna system according to claim 6, wherein the slot comprises a substantially off-centered cross-aperture.

9. The antenna system according to claim 5, wherein the top metallization comprises a conductive member.

10. The antenna system according to claim 5, wherein the top metallization comprises a silver conducting film.

11. The antenna system according to claim 5, wherein the top metallization comprises an indium tin oxide optically transparent conducting film.

12. The antenna system according to claim 5, wherein the top metallization is positioned on an exterior surface of the outer glass layer, wherein a radome covers the top metallization.

13. The antenna system according to claim 5, wherein the top metallization is positioned between the outer glass layer and the plastic layer.

14. The antenna system according to claim 13, wherein the top metallization is located in a bezeled portion of the plastic film.

15. The antenna system according to claim 13, wherein the top metallization is located in a bezeled portion of the outer glass layer.

16. The antenna system according to claim 5, wherein the top metallization is positioned between the inner glass layer and the plastic layer.

17. The antenna system according to claim 16, wherein the top metallization is located in a bezeled portion of the plastic film.

18. The antenna system according to claim 16, wherein the top metallization is located in a bezeled portion of the inner glass layer.

19. The antenna system according to claim 5, wherein the excitation element is located within a bezeled portion of an adjustment arm of the rear-view mirror assembly.

* * * * *